(12) United States Patent
Tankersley et al.

(10) Patent No.: US 12,392,415 B2
(45) Date of Patent: *Aug. 19, 2025

(54) BARREL VALVE

(71) Applicant: COLUMBIA INSURANCE COMPANY, Omaha, NE (US)

(72) Inventors: Adam Drew Tankersley, Dalton, GA (US); Jesse Andrew Guzowski, Dalton, GA (US)

(73) Assignee: COLUMBIA INSURANCE COMPANY, Omaha, NE (US)

( * ) Notice: Subject to any disclaimer, the term of this patent is extended or adjusted under 35 U.S.C. 154(b) by 1 day.

This patent is subject to a terminal disclaimer.

(21) Appl. No.: 18/465,030

(22) Filed: Sep. 11, 2023

(65) Prior Publication Data

US 2023/0417330 A1   Dec. 28, 2023

Related U.S. Application Data

(63) Continuation of application No. 17/186,141, filed on Feb. 26, 2021, now Pat. No. 11,788,631.

(60) Provisional application No. 62/983,260, filed on Feb. 28, 2020.

(51) Int. Cl.
  *F16K 5/02* (2006.01)
  *F16K 5/04* (2006.01)
  *F16K 11/085* (2006.01)

(52) U.S. Cl.
  CPC .......... *F16K 5/0207* (2013.01); *F16K 5/0407* (2013.01); *F16K 11/085* (2013.01)

(58) Field of Classification Search
  CPC ........ F16K 5/18; F16K 5/0407; F16K 5/0492; F16K 5/0207; F16K 11/00; F16K 11/085; F16K 11/0853; F16K 11/0856; F16K 27/00; F16K 27/003; F16K 27/0272; F16K 27/0281; F16K 31/44; F16K 31/50; F16K 5/045; F16K 5/12; F16K 5/0471
  See application file for complete search history.

(56) References Cited

U.S. PATENT DOCUMENTS

| 2,062,422 A |   | 12/1936 | Meese |
| 3,133,723 A | * | 5/1964 | Goldman .............. F16K 5/0478 |
|   |   |   | 251/309 |
| 3,168,280 A |   | 2/1965 | Mueller |
| 3,208,719 A |   | 9/1965 | Hulsey |

(Continued)

OTHER PUBLICATIONS

U.S. Appl. No. 17/186,141 2021/0270376 U.S. Pat. No. 11,788,631, filed Feb. 26, 2021 Sep. 2, 2021 Oct. 17, 2023, Adam Drew Tankersley, Barrel Valve.

(Continued)

*Primary Examiner* — Craig M Schneider
*Assistant Examiner* — Andrew J Rost
(74) *Attorney, Agent, or Firm* — Lathrop GPM LLP; Laura A. Labeots (57) ABSTRACT

A barrel valve assembly for a fluid distribution manifold. A barrel valve body has an off-axis passage with substantially linear walls therethrough, allowing for a substantially linear relationship between fluid flow through the body and angular rotation of the barrel valve within the manifold. The barrel valve thus requires a smaller working environment for the valve assembly, providing benefits in terms of assembly size and weight.

19 Claims, 4 Drawing Sheets

(56) References Cited

U.S. PATENT DOCUMENTS

| | | | | |
|---|---|---|---|---|
| 3,314,644 A | * | 4/1967 | Dwyer | F16K 27/065 |
| | | | | 251/309 |
| 3,349,799 A | * | 10/1967 | Mueller | F16K 5/188 |
| | | | | 137/625.22 |
| 3,383,088 A | * | 5/1968 | Duffey | F16K 27/062 |
| | | | | 251/317 |
| 3,430,919 A | * | 3/1969 | Frazier | F16K 39/06 |
| | | | | 251/312 |
| 3,536,295 A | * | 10/1970 | Sinkler | F16K 5/0271 |
| | | | | 251/283 |
| 3,759,295 A | | 9/1973 | Dence | |
| 3,802,457 A | * | 4/1974 | Wurzburger | F16K 31/5284 |
| | | | | 251/286 |
| 3,918,493 A | * | 11/1975 | Tobias | F16K 11/072 |
| | | | | 137/625.23 |
| 4,543,996 A | | 10/1985 | Baron | |
| 4,655,252 A | | 4/1987 | Krumhansl | |
| 4,705,058 A | * | 11/1987 | Marklew | F16K 27/065 |
| | | | | 251/309 |
| 4,774,984 A | * | 10/1988 | Peters | F16K 47/045 |
| | | | | 251/127 |
| 4,909,211 A | * | 3/1990 | Cook | F02D 9/16 |
| | | | | 137/601.01 |
| 4,958,802 A | | 9/1990 | Underwood | |
| 5,108,075 A | * | 4/1992 | Downard | F16K 5/10 |
| | | | | 251/312 |
| 5,392,813 A | | 2/1995 | Smith et al. | |
| 5,531,247 A | * | 7/1996 | Borst | B67D 7/365 |
| | | | | 251/283 |
| 8,118,277 B2 | * | 2/2012 | Cipolla | F16K 5/0407 |
| | | | | 251/304 |
| 10,215,294 B2 | | 2/2019 | Ferrer | |
| 2016/0025230 A1 | | 1/2016 | Postevka | |
| 2017/0184205 A1 | | 6/2017 | Eitzinger et al. | |

OTHER PUBLICATIONS

U.S. Appl. No. 18/465,030 2023/0417330, filed Sep. 11, 2023 Dec. 28, 2023, Adam Drew Tankersley, Barrel Valve.

International Search Report and Written Opinion for PCT Application No. PCT/US2021/019800, dated May 6, 2021.

\* cited by examiner

BARREL VALVE

CROSS-REFERENCE TO RELATED APPLICATION

This application is a continuation of U.S. patent application Ser. No. 17/186,141, filed Feb. 26, 2021, which claims the benefit of priority U.S. Provisional Application No. 62/983,260, filed on Feb. 28, 2020, the entirety of which is incorporated herein by reference.

BACKGROUND

Current air distribution manifolds can be large, heavy, and bulky. Typically, commercially available valves are associated with fluid flow channels through modules external to a manifold or housing containing the flow channels, thus increasing the volume required to accommodate such a valved manifold.

Further, precise metering of flow volumes using currently available valves, such as ball valves, is challenging. This is attributable to the fact that a given angular rotation of a common valve results in differing changes in flow volumes, depending upon how far the valve is already open or closed. For example, a typical ball valve utilizes a round port. If the valve is closed, a given angular rotation of the valve in the open direction will reveal a relatively small portion of the round port. However, if the valve is already partly open, the same degree of angular rotation will increase the flow volume exponentially, given the round profile of the port. Predictable flow volume control is thus a challenge.

While some available valves can provide more precise control over flow volumes, they have their own associated drawbacks. For example, a typical gate valve can provide accurate and precise control over fluid flows, but require multiple revolutions to vary from closed to fully open.

Thus, there exists a need for a smaller, lighter and more ergonomic valve that can be implemented directly into a flow channel distribution manifold without the requirement for a bulky external housing, that provides a linear relationship between actuation and flow control, and that requires a minimal amount of actuation for a full range of flow control. Such a device, if provided, would enable unique and beneficial functional control over fluid flows in a compact space.

BRIEF SUMMARY

The present application is directed to a fluid metering valve that may be integrated directly into a flow channel manifold intermediate two flow channels. The fluid metering valve is provided with a barrel valve having a passage that extends off-axis along a length of and through the barrel valve. When in a closed orientation, a solid portion of the barrel valve blocks the passage intermediate the two flow channels. Rotation of the barrel valve exposes a portion of the passage intermediate the two flow channels, allowing a metered amount of fluid flow therebetween. The off-axis passage and associated solid portion of the barrel valve enable the thickness of the distribution manifold receiving the valve to be minimized, thereby reducing the overall footprint and weight of the manifold.

Beneficially, the passage is formed with a square, rectangular or rounded rectangular cross-section. Such a configuration enables a linear or near linear relationship between change in fluid flow volume through the passage and change in angular position of the barrel valve relative to the distribution manifold. This linearity provides a more predictable response to valve manipulation. In addition, such a configuration enables the valve to change from fully closed to fully open in less than one-hundred twenty degrees of barrel valve rotation and preferably ninety degrees or less, allowing for a faster rate of fluid flow increase or decrease.

A further advantage enabled by the presently disclosed fluid metering valve is that the volume of material in the barrel valve may be minimized, thereby contributing to weight and size reduction.

In an aspect of the present embodiments, a fluid metering valve assembly includes a barrel valve having a valve body, the body being substantially symmetrical about an axis of symmetry. The valve body has first and opposite second ends along the body axis of symmetry and a passage formed laterally through the body.

The passage comprises mutually parallel, planar first and second side walls, each lying in respective plane that is parallel to the body axis of symmetry. The passage also comprises a first planar end wall, intermediate ends of the first and second side walls most proximate the body first end, and a second planar end wall, intermediate ends of the first and second side walls most proximate the body second end. The first end wall is parallel to the second end wall and both the first and second end walls lie in a respective plane that is orthogonal to the body axis of symmetry.

The passage also comprises transition regions between the first planar end wall and the ends of each of the first and second side walls most proximate the body first end and between the second planar end wall and the ends of each of the first and second side walls most proximate the body second end. In an embodiment, the transition regions are each a right angle, whereby a cross-section of the passage coincident with the valve body axis of symmetry is a rectangle or square. In another embodiment, the transition regions are each a circular arc having a central angle of ninety degrees, whereby a cross-section of the passage coincident with the valve body axis of symmetry is a rounded rectangle or rounded square.

In another aspect of the present embodiments, a method of selectively interconnecting mutually adjacent first and second flow channels in a distribution manifold using a fluid metering valve is disclosed. The method includes providing a barrier wall intermediate and separating the first and second flow channels, providing a semi-cylindrical bore through the barrier wall, the bore forming an aperture in the barrier wall between the first and second flow channels, and disposing a barrel valve having a valve body within the barrier wall bore. The valve body is substantially symmetrical about a respective axis of symmetry and comprises first and opposite second ends along the body axis of symmetry and a passage formed laterally through the body.

The passage comprises mutually parallel, planar first and second side walls, each lying in respective plane that is parallel to the body axis of symmetry, a first planar end wall, intermediate ends of the first and second side walls most proximate the body first end, and a second planar end wall, intermediate ends of the first and second side walls most proximate the body second end. The first end wall is parallel to the second end wall and both the first and second end walls lie in a respective plane that is orthogonal to the body axis of symmetry.

The passage further comprises transition regions between the first planar end wall and the ends of each of the first and second side walls most proximate the body first end and between the second planar end wall and the ends of each of the first and second side walls most proximate the body second end. In an embodiment, the transition regions are each a right angle, whereby a cross-section of the passage coincident with the valve body axis of symmetry is a rectangle or square. In another embodiment, the transition regions are each a circular arc having a central angle of ninety degrees, whereby a cross-section of the passage coincident with the valve body axis of symmetry is a rounded rectangle or rounded square.

The method further comprises selectively rotating the barrel valve within the bore to selectively align the passage relative to the first and second flow channels, whereby at least a portion of the passage is exposed to both the first and second flow channels, the first and second flow channels being in mutual fluid communication therethrough, or whereby the valve body is intermediate the first and second flow channels within the bore, the first and second flow channels being mutually isolated thereby.

DETAILED DESCRIPTION OF EXEMPLARY EMBODIMENTS

Figure 1A:
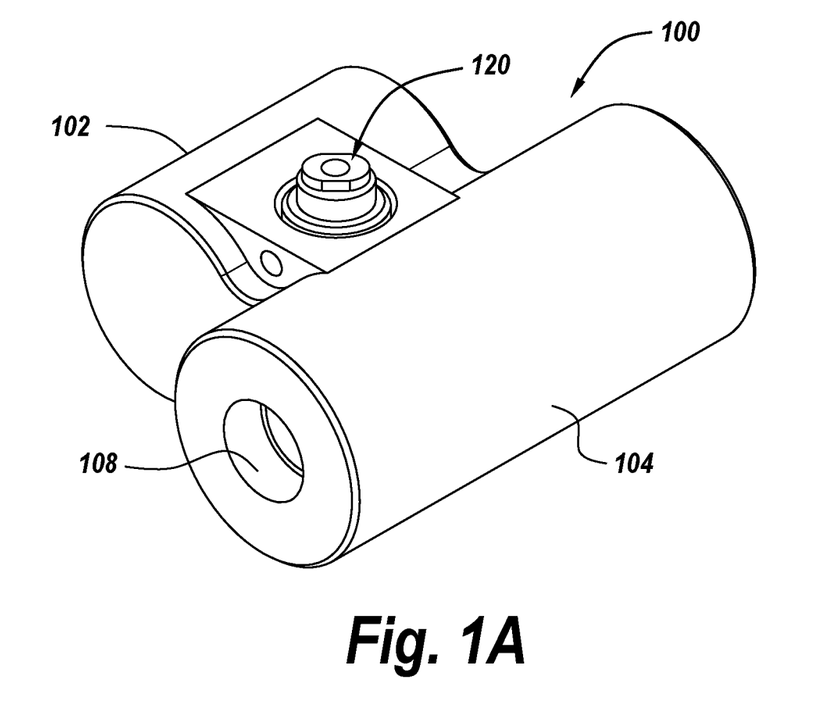
FIG. 1A is a perspective view of a distribution manifold having a valve assembly according to the present disclosure.
Figure 1B:
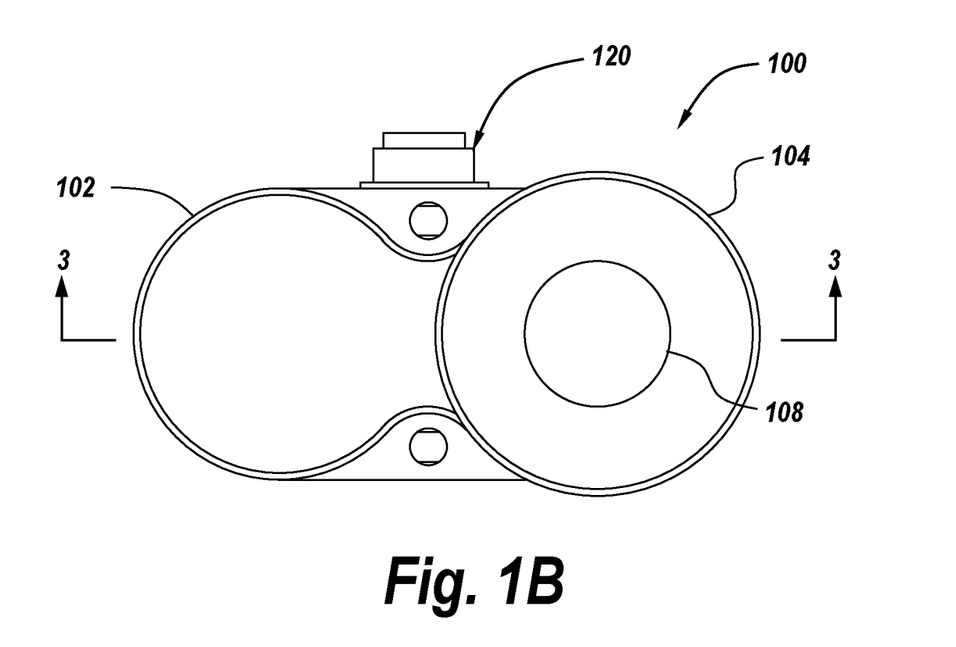
FIG. 1B is an elevation view of the distribution manifold of FIG. 1A.

FIGS. 1A and 1B show a particular embodiment of a distribution manifold 100 having a valve assembly 120 disposed therein according to the present disclosure. The illustrated manifold includes first and second mutually parallel flow channels 102, 104, the flow channels being in selective mutual communication via the valve assembly. The manifold is also visible in a horizontal section views in FIGS. 3A and 3B.

In the illustrated embodiment, the first flow channel 102 terminates within the manifold, opposite an open end 106, while the second flow channel 104 has dual open ends 108, 110, though the presently disclosed valve assembly 120 is operable in association with other manifold embodiments as well. Each flow channel open end may be provided with suitable features to facilitate the selective coupling of fluid-conveying members such as hoses, tubes or pipes. These features may be, for example, mutually cooperating threads disposed on or in a manifold open end and on or in an end of the cooperating fluid-conveying member. Alternatively, mutually cooperating male and female quick connect fittings may be employed for purposes of selective coupling.

Figure 3A:
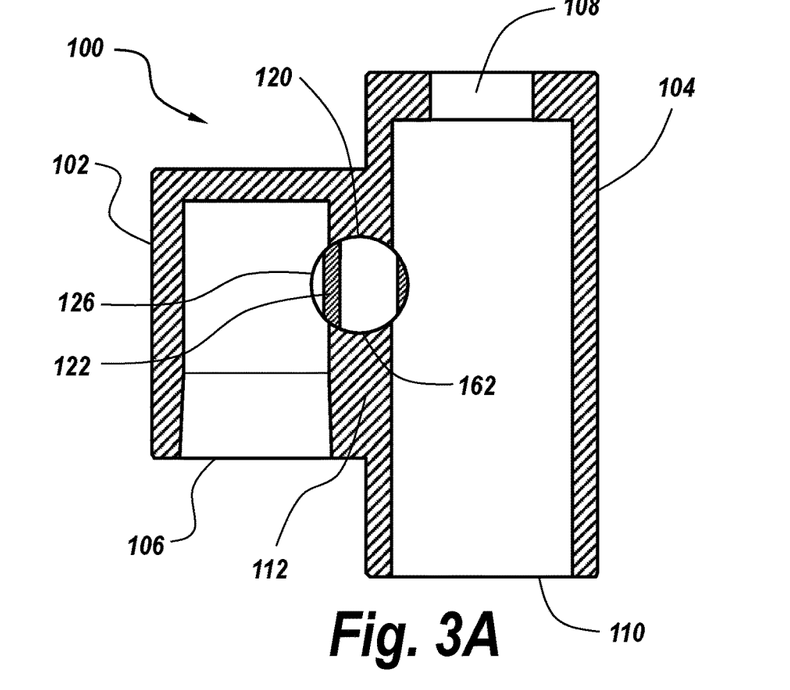
FIG. 3A is a top section view of the manifold of FIG. 1B taken along section lines 3-3 illustrating the barrel valve of FIGS. 2A, 2B and 2C in a closed orientation relative to the distribution manifold.
Figure 3B:
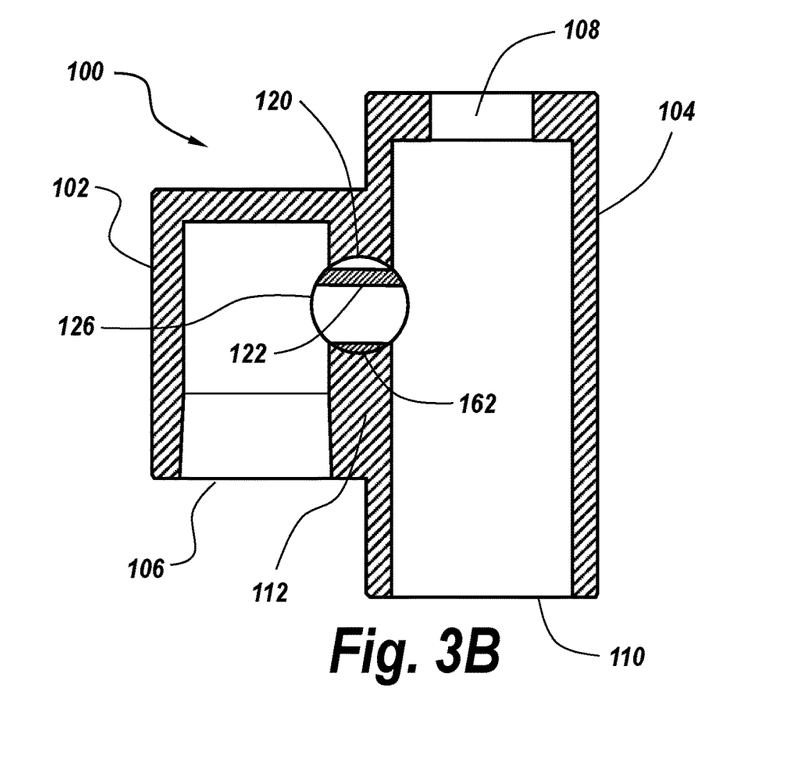
FIG. 3B is a top section view of the manifold of FIG. 1B taken along section lines 3-3 illustrating the barrel valve of FIGS. 2A, 2B and 2C in an open orientation relative to the distribution manifold.

As shown in FIGS. 3A and 3B, the substantially cylindrical valve assembly 120 is disposable in a semi-cylindrical bore 162 formed within a barrier wall 112 intermediate the first and second mutually parallel flow channels 102, 104. As illustrated in the exploded view of FIG. 4, the valve assembly includes a barrel valve 122. In certain embodiments of the valve assembly, additional elements are included, such as one or more O-rings 124, also referred to as circular seals, and a liner 126, as discussed below.

Figure 2A:
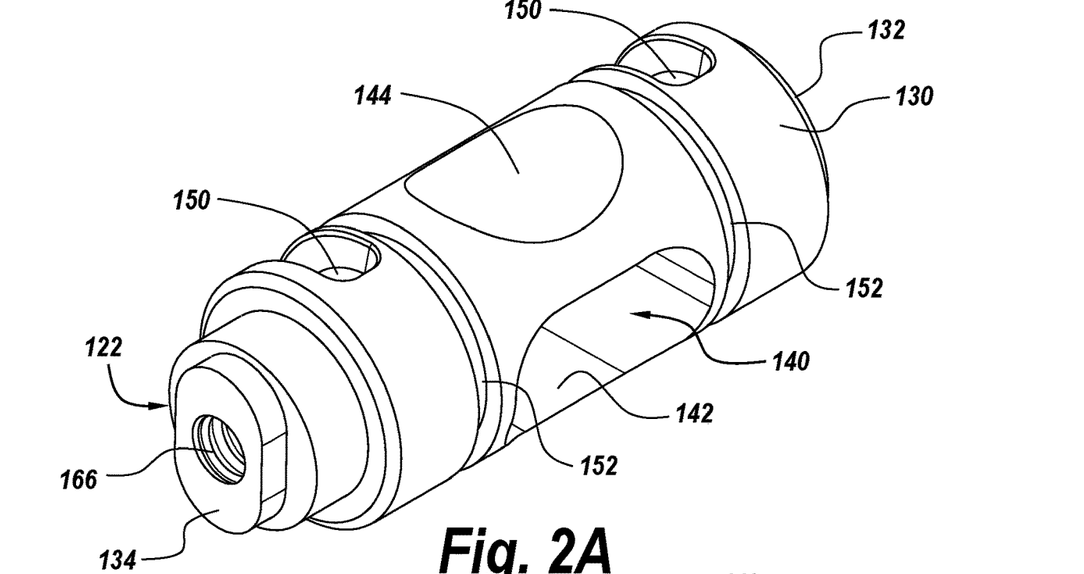
FIG. 2A is a perspective view of a barrel valve for use in the valve assembly of FIGS. 1A and 1B.
Figure 2B:
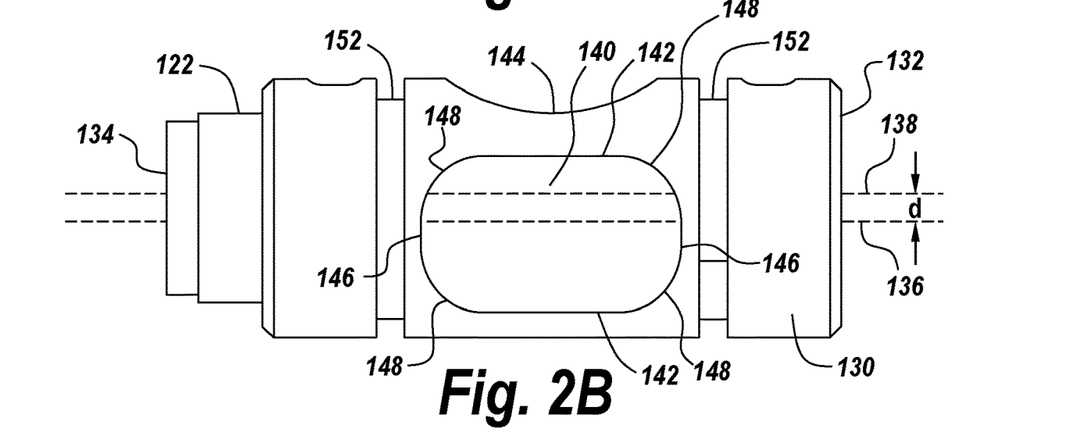
FIG. 2B is a side elevation view of the barrel valve of FIG. 2A.
Figure 2C:
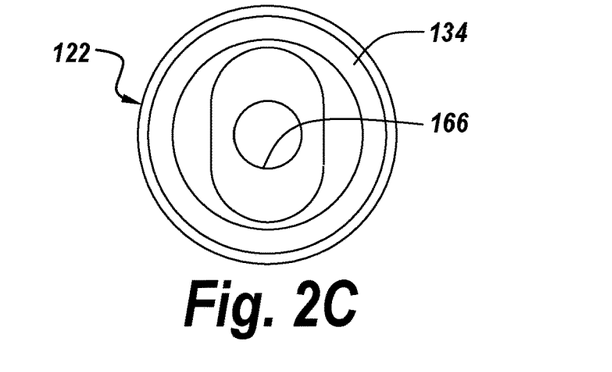
FIG. 2C is an end elevation view of the barrel valve of FIGS. 2A and 2B.

The barrel valve 122 is depicted in detail in FIGS. 2A, 2B and 2C. The barrel valve has a substantially cylindrical body 130 having an axis of symmetry 138 and first and second opposite ends 132, 134. Intermediate the two ends, a passage 140 extends laterally across and through the body. The passage is comprised of two mutually parallel, planar side walls 142 and two mutually parallel, planar end walls 146. The side walls each lie in a plane that is parallel to the axis of symmetry. A first end wall is intermediate the ends of a first side wall and a second side wall that are most proximate the body first end, while a second end wall is intermediate the ends of the first side wall and the second side wall that are most proximate the body second end. The end walls each lie within a respective plane that is orthogonal to the body axis of symmetry. A plane 136 intermediate or halfway between the first and second side walls is parallel to but offset or spaced from the body axis of symmetry by a non-zero distance "d".

Transitions 148 extend between the first planar end wall 146 and the ends of the first and second side walls 142 most proximate the body first end 132 and between the second planar end wall and the ends of the first and second side walls most proximate the body second end 134. The body axis 138 of symmetry orthogonally intersects either both first and opposite second end walls of the passage or two opposing transitions.

As depicted, the passage 140 is a rounded rectangle in cross-sectional shape as a result of each transition 148 being a circular arc having a central angle of ninety degrees. In alternative embodiments, the passage may present a rounded square. In yet further embodiments, each transition 148 is a right angle, whereby the passage is a rectangle or square. In all embodiments, however, it is preferable to have substantially linear side walls 142 and end walls 146 therebetween. These characteristics provide for a substantially linear response in adjustment of flow rate with respect to degree of barrel valve 122 rotation, a significant improvement with respect to prior art valves used for similar purposes. A full range of flow control is thus enabled within 120 degrees of barrel valve 122 rotation, or more preferably, within 90 degrees of barrel valve rotation.

The plane 136 intermediate the first and second side walls 142 being offset or spaced from the body axis of symmetry 138 places the passage 140 off axis relative to the axis of the valve body 130. This characteristic is useful in that a portion of the body may extend into one of the flow channels 102, 104, beyond its seal, while an opposite portion of the valve body extends across a semi-cylindrical bore 162 in the manifold barrier wall 112 (discussed subsequently), thereby preventing fluid flow therethrough. This orientation is depicted in FIG. 3A and results in an ability to utilize a thinner barrier wall between flow channels, thus reducing the overall footprint and weight of the distribution manifold.

Figure 4:
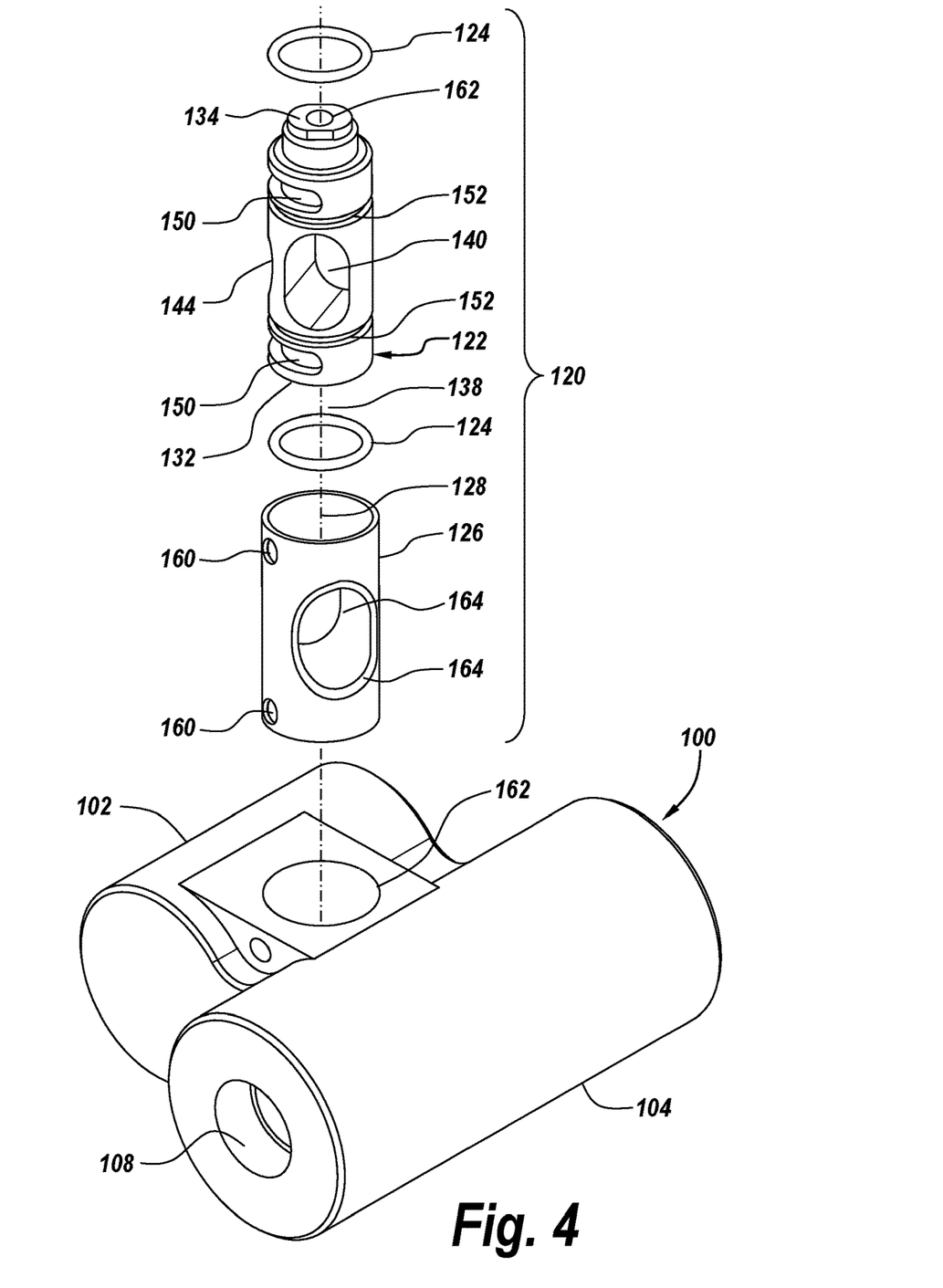
FIG. 4 is an exploded, perspective view of the distribution manifold of FIGS. 1A and 1B having a valve assembly, including the barrel valve of FIGS. 2A, 2B and 2C.

In an embodiment, the barrel valve 122 has at least one rotation limiting channel 150 formed on the body 130. In FIGS. 2A and 4, two such channels are provided, one proximate the body first end 132 and one proximate the body second end 134. These channels are each intended to receive and cooperate with a respective fixed projection (not shown) extending radially inward from a portion of the distribution manifold 100 barrier wall 112. Rotation of the barrel valve is thus limited by the radial distance that the rotation limiting channel or channels extend about the body. In one embodiment, the channel or channels extend in an arc of 120 degrees or less about the body axis of symmetry 138 on the outer surface of the body. In a further embodiment, the channel or channels extend in an arc of roughly ninety degrees or less.

In order to minimize weight and the quantity of material required to fabricate the valve assembly 120, the valve body 130 may be provided with a cutout 144 formed on an outer surface of the body. In the illustrated embodiment of FIGS. 2A and 2B, the cutout is formed as a semi-cylindrical depression opposite one of the side walls 142. The cutout, if provided in other embodiments, may be provided with a variety of shapes as long as the structural integrity of the valve body forming the passage is not sacrificed.

The barrel valve 122 as described in the foregoing may be disposed within a semi-cylindrical bore 162 extending into the barrier wall 112 intermediate the first and second flow channels 102, 104. A sealing effect between the barrel valve and the bore may be achieved from appropriate lapping, grinding, burnishing or other surface treatment of the respective parts. Such treatment may vary, depending upon the materials chosen, which itself may be influenced by the specific fluid flow application involved. Suitable materials may include stainless steel for the barrel valve, which may be burnished for a closer tolerance fit with respect to the bore. However, other materials may also be selected, including thermoplastics or composites, with or without coatings or platings as desired or required. Factors varying with the application may include sealing pressures, cost of manufacture, fluid compatibility and reactivity, and rotational force required to manipulate the barrel valve.

However, in other embodiments, the valve assembly 120 is provided with additional elements, as follows. In such a further embodiment of the valve assembly 120, the valve body 130 is also provided with at least one seal-receiving circular groove 152. As shown in the embodiment illustrated in FIGS. 2A, 2B, and 4, two such grooves are provided, one on either side of the passage 140. The grooves are mutually parallel and are configured to receive O-rings or circular seals 124 therein. This embodiment of the valve assembly, comprising a barrel valve 122 and O-rings, may be installed directly into the semi-cylindrical bore 162 in the barrier wall 112, the O-rings bearing against the bore walls as the valve assembly is selectively rotated about its axis of symmetry 138.

In yet a further embodiment, the valve assembly 120 further comprises, in addition to a barrel valve 122 and O-rings 124, a liner 126 comprised of a substantially cylindrical shell with a respective axis of symmetry 128. The liner is intended for stationary installation into the bore 162 in the barrier wall 112. An inner diameter of the liner is selected to receive the barrel valve therein with an outer peripheral extent of the 124 configured for physical engagement with the inner surface of the liner, the sliding against the inner surface of the liner when the barrel valve 122 is rotated. A pair of mutually opposite apertures 164 are provided through the liner. When the barrel valve is disposed within the liner, the body may be rotated about its axis of symmetry 138, coincident with the axis of symmetry of the liner, such that the valve body passage 140 may be aligned with the mutually opposite liner apertures, when the valve assembly is in an open orientation, out of alignment with the mutually opposite liner apertures, when the valve assembly is in a closed orientation, or at some rotational orientation such that a portion of the valve body passage is exposed within the mutually opposite liner apertures.

The liner 126 may be provided with one or more orifices 160. When the barrel valve 122 is installed within the liner, each of the at least one rotation limiting channels 150 formed on the body 130 is beneath a corresponding liner orifice. In this manner, a fixed projection (not shown) extending radially inward from a portion of the distribution manifold 100 barrier wall 112 may extend through each liner orifice and into the corresponding and underlying rotation limiting channel.

The liner 126 may be provided of a variety of materials, including glass reinforced PTFE, brass, bronze, nylon, and acetal variants, with or without O-rings which, if used, may be made of Buna N. The sealing liner may also be provided of stainless steel, which may be burnished, for use with or without O-rings intermediate the liner and barrel valve 122.

Further still, an embodiment of the valve assembly 120 comprises the barrel valve 122 and liner 126, without O-rings 124.

As best seen in FIGS. 2A and 2C, the barrel valve 122 second end 134 is provided with a bore 166 formed therein. The bore may be provided with physical features for selectively engaging a separate member (not shown) that may be manually or automatically rotated about the valve body 130 axis of symmetry 138, thereby rotating the barrel valve relative to the distribution manifold 100. For example, the bore may be provided with internal spiral threads. The rotation member is then provided with a cylindrical projection having complimentary spiral threads for engagement within the bore. Either or both barrel valve ends may have such physical features for selective engagement with a rotation member.

Also disclosed is a method of selectively interconnecting mutually adjacent flow channels 102, 104 in a distribution manifold 100 using a fluid metering valve assembly 120 including the barrel valve 122 described above, with or without the O-rings 124 and/or liner 126. The method includes providing a barrier wall 112 intermediate and separating first and second flow channels, forming a semi-cylindrical bore 162 within the barrier wall thereby forming an aperture intermediate the two flow channels, and disposing a barrel valve such as described in the foregoing into the bore. The barrel valve may then be selectively rotated within the bore to align the passage 140 relative to the first and second flow channels. The two flow channels may thus be in varying degrees of fluid communication via the valve body 130 passage or may be mutually isolated by the valve body, depending upon the rotational orientation of the barrel valve within the bore.

The method may be practiced utilizing the barrel valve 122 alone within the barrier wall 112 bore 162, or may be practiced with a valve assembly 120 including the barrel valve and at least one O-ring 124 disposed within a respective circular groove 152. Further, the method may further be practiced with a valve assembly including the foregoing elements, along with the substantially cylindrical liner 126 as described above. In all embodiments, rotation of the barrel valve relative to the barrier wall bore results in a selective amount of fluid communication between the first and second flow channels 102, 104 via the passage 140, or no fluid communication at all.

Alternative embodiments of the subject matter of this application will become apparent to one of ordinary skill in the art to which the present invention pertains, without departing from its spirit and scope. It is to be understood that no limitation with respect to specific embodiments shown here is intended or inferred.

What is claimed is:

1. A barrel valve assembly comprising:
   (a) a barrel valve comprising a cylindrical, hollow body having at least one opposite open end(s) wherein the body is intersected laterally across and through by an off-axis passage; and
   (b) a cylindrical liner comprised of a hollow shell configured to receive the body of the barrel valve inside the liner wherein the liner comprises a pair of mutually opposite apertures, which are located near the cross-section of the off-axis passage of the barrel valve;
   wherein the barrel valve is situated and rotatable within the liner, both having a coincident axis of symmetry;
   wherein when the body of the barrel valve is rotated about its axis of symmetry, such that when the off-axis passage is fully aligned with the mutually opposite apertures of the liner, the valve assembly is in an open orientation; when the off-axis passage is fully misaligned with the mutually opposite apertures, the valve assembly is in a closed orientation; and when the off-axis passage is partially aligned with the mutually opposite apertures of the liner, the valve assembly is in a partially open orientation; and
   wherein the liner comprises at least one orifice formed through the liner and the body of the barrel valve comprises at least one rotation limiting channel formed on an outer surface of the body, wherein each of the at least one orifice is capable of being aligned with a respective one of the at least one rotation limiting channel formed on the outer surface of the body when the body is disposed within the liner.

2. The barrel valve assembly of claim 1 comprising the capability to change from fully closed to fully open in less than one-hundred-twenty degrees of rotation upon selective rotation of the barrel valve within the liner.

3. The barrel valve assembly of claim 1, wherein the barrel valve comprises a composition comprising stainless steel, thermoplastic, or composite materials.

4. The barrel valve assembly of claim 1, wherein the barrel valve comprises a cutout on the outer surface of the body that does not penetrate entirely through the body.

5. The barrel valve assembly of claim 1, wherein the barrel valve comprises at least one seal-receiving circular groove around a perimeter of the barrel valve, wherein the groove is capable of receiving a seal, for engagement with an inner surface of the liner.

6. The barrel valve assembly of claim 1, wherein the liner comprises glass-reinforced PTFE, brass, bronze, an acetal variant, or stainless steel.

7. The barrel valve assembly of claim 1, wherein the off-axis passage comprises a cross-sectional shape comprising a rounded rectangle, rounded square, rectangle, or square.

8. The barrel valve assembly of claim 1, wherein the passage comprises linear side walls and linear end walls.

9. The barrel valve assembly of claim 1, wherein at least one of ends of the body have a bore formed therein, the bore comprising an internal, spiral thread for selectively receiving a cylindrical projection of a member therein, the cylindrical projection of the member having an external spiral thread formed thereon for adjusting a rotational position of the body about a body axis of symmetry.

10. The barrel valve assembly of claim 9, further comprising an actuation member having a cylindrical projection within the at least one bore, the actuation member having an external spiral thread formed thereon;
   wherein the at least one bore has the internal, spiral thread for selectively receiving the actuation member therein; and
   wherein the actuation member is rotatable to selectively rotate the body within the liner about the body axis of symmetry.

11. The barrel valve assembly of claim 1, wherein the passage comprises mutually parallel, planar first and second side walls, each lying in a respective plane that is parallel to an axis of symmetry of the body.

12. The barrel valve assembly of claim 11, wherein the planar first side wall intersects a first end wall near a first end of the body and the planar second side wall intersects a second end wall near a second end of the body wherein the end walls each lie within a respective plane that is orthogonal to the axis of symmetry of the body.

13. The barrel valve assembly of claim 12, wherein transitions extend between the first end wall and ends of the first and second side walls and between the second end wall and ends of the first and second side walls.

14. The barrel valve assembly of claim 1, wherein transitions comprise a circular arc having a central angle of ninety degrees or a right angle.

15. The barrel valve assembly of claim 1, wherein the liner is used with or without O-rings intermediate the liner and barrel valve, wherein the O-rings are situated within grooves in the barrel valve.

16. The barrel valve assembly of claim 1, wherein the barrel valve comprises a presence or absence of a coating or plating.

17. The barrel valve assembly of claim 1 comprising the capability to change from fully closed to fully open in less than ninety degrees of rotation upon selective rotation of the barrel valve within the liner.

18. The barrel valve assembly of claim 1, wherein the pair of mutually opposite apertures of the liner are identical to the cross-section of the passage of the barrel valve in size, shape, and/or location on the passage of the barrel valve.

19. A barrel valve assembly comprising:
   (a) a barrel valve comprising a hollow body having at least one opposite open end(s) wherein the body is intersected laterally across and through by an off-axis passage; and
   (b) a liner comprised of a hollow shell configured to receive the body of the barrel valve inside the liner wherein the liner comprises a pair of mutually opposite apertures, which are located near the cross-section of the off-axis passage of the barrel valve;
   wherein the barrel valve is situated and movable within the liner, both having a coincident axis of symmetry; and
   wherein when the body of the barrel valve is moved about its axis of symmetry, such that when the off-axis passage is fully aligned with the mutually opposite apertures of the liner, the valve assembly is in an open orientation; when the off-axis passage is fully misaligned with the mutually opposite apertures, the valve assembly is in a closed orientation; and when the off-axis passage is partially aligned with the mutually opposite apertures of the liner, the valve assembly is in a partially open orientation; and
   wherein the liner comprises at least one orifice formed through the liner and the body of the barrel valve comprises at least one rotation limiting channel formed on an outer surface of the body, wherein each of the at least one orifice is capable of being aligned with a respective one of the at least one rotation limiting channel formed on the outer surface of the body when the body is disposed within the liner.

* * * * *